April 19, 1966 — K. W. KAMPERT ETAL — 3,246,778
ARTICULATED TRACTOR LOADER
Filed Aug. 29, 1963 — 2 Sheets-Sheet 2
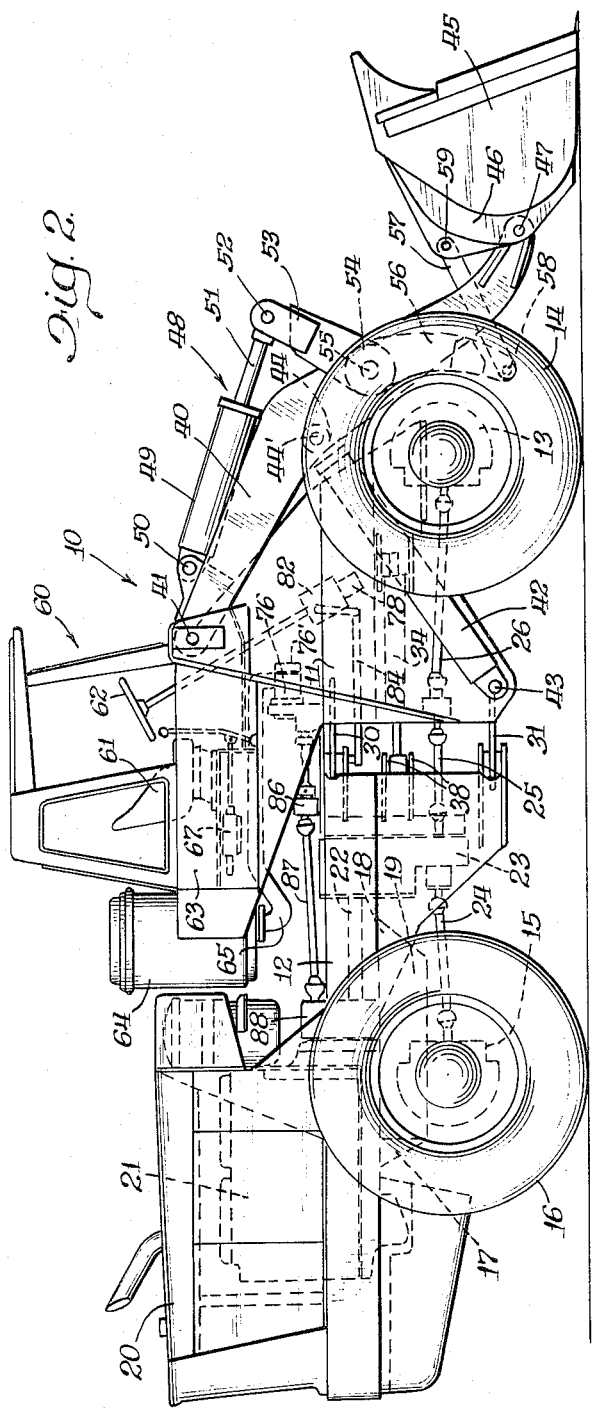
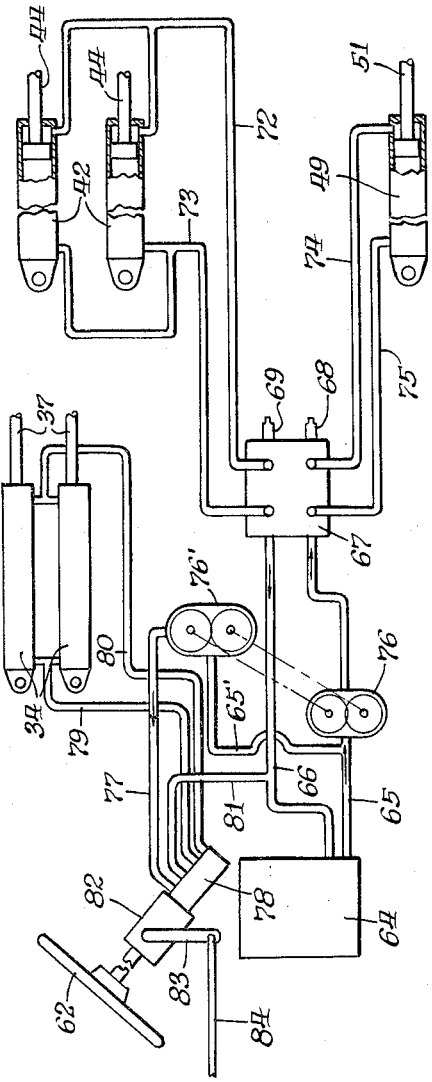
INVENTORS.
Keith W. Kampert
Richard J. Zimmerman
By Edward O. Vogl
Atty.

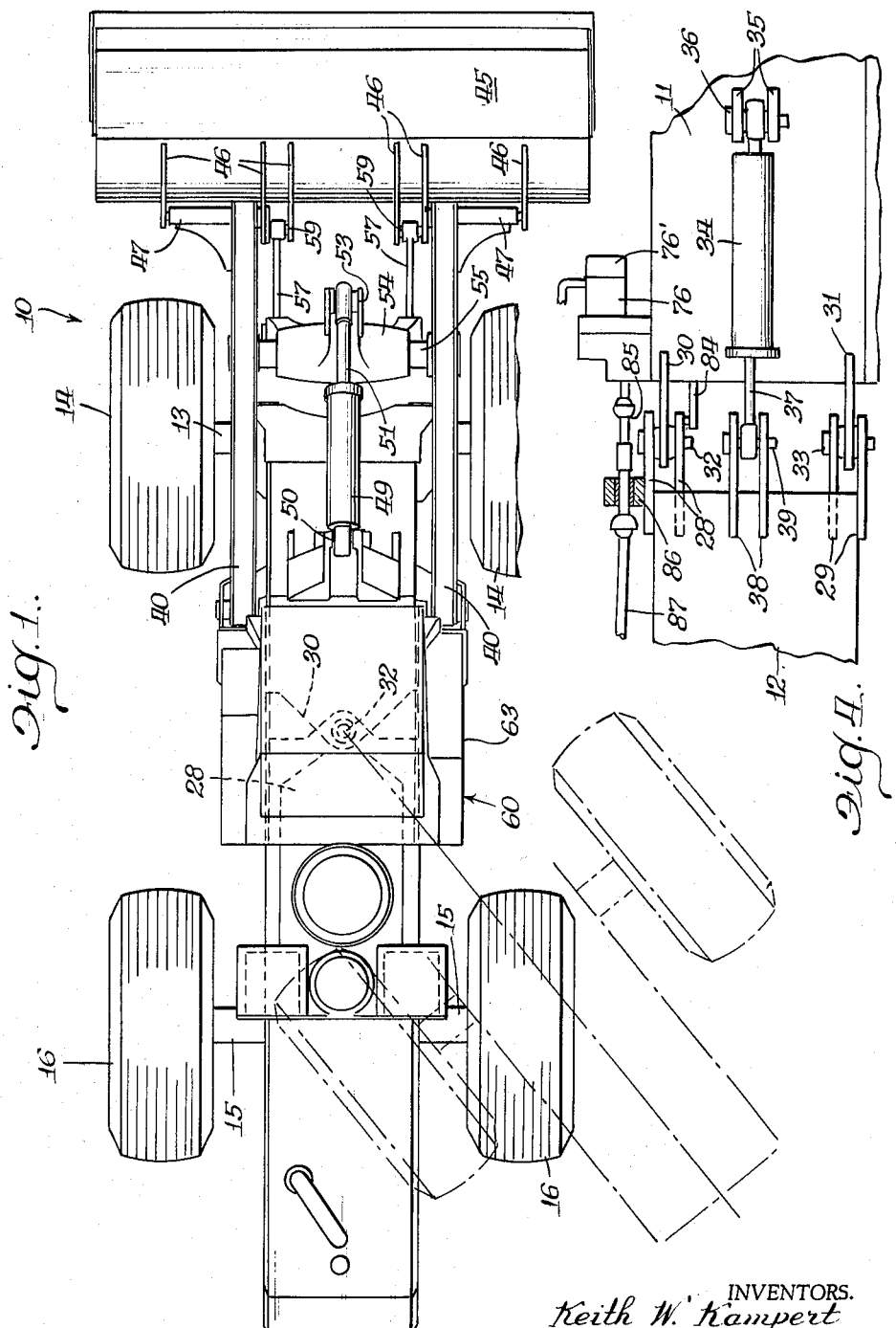

3,246,778
ARTICULATED TRACTOR LOADER
Keith W. Kampert, Libertyville, and Richard F. Zimmerman, Waukegan, Ill., assignors to The Frank G. Hough Co., a corporation of Illinois
Filed Aug. 29, 1963, Ser. No. 305,321
6 Claims. (Cl. 214—140)

This invention relates to tractor loaders and more particularly to a tractor loader having front and rear frame sections hingedly connected together for steering articulation.

In the conventional articulated loader, the vehicle comprises front and rear frame sections which are hingedly connected together about a vertical pivot axis. Steering of the vehicle is effected by means of hydraulic rams which are pivotally connected between the frame sections and during actuation of the rams effectuate relative angular movement of one frame with respect to the other thereby providing for steering of the vehicle. The present device with which the invention is particularly concerned comprises an articulated vehicle having the engine positioned on the rear frame and which by suitable means, such as universal connections, drives the four wheels of the vehicle. The front frame includes an extension which extends rearwardly over the vertical pivot axis and which supports thereon an operator's cab and seat. The groundworking implement, which in this case is shown as a loader bucket, is pivotally connected to vertically movable boom arms in turn pivotally connected to the front frame of the loader. Suitable control linkage is provided to maintain the bucket in proper position during raising and lowering and for dumping the same. The raising and lowering of the boom arms is accomplished by fluid rams and the dumping of the bucket is also accomplished by the control linkage which includes a fluid ram. Thus raising of the bucket, control of the bucket, and steering of the vehicle is effected by means of fluid rams.

In the conventional vehicles, it is prevalent to provide components of the hydraulic system on both the front and rear sections of the articulated vehicle. In these instances, it is necessary to support high pressure hydraulic lines on the front and rear vehicles and through the hinged connection. This creates many problems and difficulties. Also, in some cases the hydraulic controls are provided to the rear of the vertical pivot axis and again the controls for actuating the hydraulic rams, which on the conventional unit may be disposed on the front frame, require the need for flexible hoses extending through the articulated joint. It is a prime object therefor of the present invention to provide an improved articulated loader wherein the power unit is located on the rear frame, the operator's cab is located on the front frame and all of the hydraulic components are located on the front frame of the vehicle with only the driving connection from the hydraulic pump to the power unit extending rearwardly of the vertical pivot axis of the vehicle.

These and further objects will become more apparent from a reading of the description when examined in connection with the accompanying sheets of drawings.

In the drawing:

FIGURE 1 is a plan view of an improved articulated tractor loader;

FIGURE 2 is a side elevational view of the loader shown in FIGURE 1;

FIGURE 3 is a schematic view of a hydraulic system for a tractor loader; and

FIGURE 4 is an enlarged detail view, partially in section, of portions of a front and rear frame showing frame steering about a vertical pivot axis.

Referring now particularly to FIGURES 1 and 2, an articulated tractor loader is generally designated by the reference character 10 and includes a front frame 11 and a rear frame 12. The front frame 11 is suitably supported on a front driving axle 13 having front drive wheels 14. A rear driving axle 15 supports the rear frame 12 and includes rear wheels 16. The rear driving axle 15 is disposed between longitudinally-spaced pivot brackets 17 and 18 projecting downwardly from the rear frame 12. A longitudinally extending pivot member 19 is pivoted between the brackets 17, 18 and is in turn rigidly secured to the rear driving axle 15. The rear frame 12 also supports an engine compartment 20 having disposed therein an engine or power unit 21. A drive shaft 22 extends forwardly from the power unit 21 and drives a power transmission unit 23, which in turn, drives universal drive connections 24, 25 and 26 for transmitting four wheel drive to the front and rear wheels of the vehicle.

As best shown in FIGURES 2 and 4, the front end of the rear frame 12 is provided with upper brackets 28 and lower brackets 29, these brackets being supported substantially along the longitudinal center line of the vehicle. Similarly, brackets 30 and 31 respectively extend between the brackets 28 and 29 and are hingedly connected thereto by means of pivot pins 32 and 33 which are in vertical alignment about a vertical pivot axis so as to permit hinging or steering movement of the front frame 11 relative to the rear frame 12. Such hinging or steering movement is effected by means of brackets 38 which are positioned on the rear frame 12 on opposite ends of the front end thereof. FIGURE 4 shows one set of brackets 38, it being understood that a similar set is connected to the other side of the frame 12. Each of the brackets 38 receives a piston rod 37 connected to an extensible ram 34 in turn supported on brackets 35 connected to opposite sides of the frame 11 for pivotal movement by means of hinge pins 36. The rods 37 are suitably hingedly connected to the brackets 38 by means of pivot members 39.

Boom arms 40, by means of pivot pins 41, are suitably pivotally connected to the front frame 11. The boom arms 40 extend forwardly of the wheels 14 and are raised and lowered by means of extensible rams 42 disposed on opposite sides of the vehicle and having ends pivotally connected by means of pins 43 to the front frame 11. The rams 42 include extensible rods 44 pivotally connected to the boom arms 40 by means of hinge pins 44'.

A bucket 45 includes a plurality of rearwardly extending brackets 46 and pivot means 47, as best shown in FIGURE 1, pivotally connects the bucket 45 to the front ends of the boom arms 40.

A control linkage for the bucket 45 is generally designated by the reference character 48. The control linkage 48 comprises a ram 49 having its rearmost end pivotally connected as indicated at 50 to the front frame 11. The ram 49 also includes an extensible rod 51 suitably connected by pivot pin means 52 to an upwardly extending arm 53 in turn connected to a cylindrical pivot member 54. The pivot member 54 is rotated on shafts 55 supported on the boom arms 40. The pivot member 54 includes a pair of downwardly projecting fork arms 56 pivotally connected to links 57 by means of pivot means 58. The links 57 project forwardly and are in turn pivotally connected to brackets 46 by means of pivot pins 59.

An operator's cab is indicated at 60 and includes a seat 61 disposed substantially over the vertical pivot axis provided by the pins 32. The operator's cab 60 further includes a steering wheel 62, the said cab being supported on a frame extension generally designated at 63. The frame extension 63 is supported by the front frame 11 and extends rearwardly of the vertical pivot axis of the pins 32 and 33. A hydraulic system, which is shown in FIGURE 3, is entirely supported and disposed on the front frame 11. The hydraulic system includes a reservoir 64 which is suitably positioned on the frame extension 63 to the rear of the cab 60. A conduit line 65 from the reservoir 64, as best shown in FIGURE 3, directs fluid under pressure to a valve designated at 67. The valve 67 may be of a conventional open-center type including valve spools 68 and 69. As best shown in FIGURE 2, the control valve 67 is positioned within the operator's cab 60 and each of the spools 68 and 69 have connected thereto a suitable actuator rod 70 and control lever 71 within easy reach of the operator for permitting individual or combined control of the valve spools 68 and 69. A conduit 72 extends to one end of the rams 42 and another conduit 73 extends from the other ends of the rams 42 to the control valve 67. Similarly, a conduit 74 extends to one end of the ram 49 and a conduit 75 extends from the other end of the ram 49 back to the control valve 67. Fluid under pressure from the reservoir 64 is directed from a pump 76 to the valve 67 and is there distributed by the control spools 68 and 69 to opposite ends of the rams 42 and 49, as desired, for actuating the same.

The pump 76 is effective to supply the fluid under pressure to the rams 42 and 49. In turn, another pump 76' is provided for generating fluid pressure for the steering of the articulated vehicle. The pump 76 and 76' are incorporated in the same casing and driven by a single drive source so that driving of the pump 76 also effectuates driving of the pump 76'. The pumps 76 and 76' may be positioned in back-to-back relation. Thus, fluid from the reservoir 64 through the conduit 65 is also delivered to the pump 76' by means of conduit 65' which in turn directs fluid under pressure to conduit 77 in communication with a steering valve 78, as shown in FIGURE 3. The steering valve 78 may be of conventional construction so as to direct fluid under pressure, as desired, to the steering rams 34. Fluid under pressure from the steering valve 78 may be alternately delivered through conduits 79 and 80 in communication with opposite ends of the rams 34. A drain conduit 81 extends from the steering valve 78 to the conduit 66 returning to the reservoir 64.

A housing 82 on the steering shaft 62 has pivotally connected thereto a lever 83 in turn connected to a tie rod 84 extending to the rear frame 12. During the operation of the hydraulic steering, the tie rod 84 and its connection to the rear frame 12 (not shown) provides for suitable follow-up, the details of which need not be further described.

The pumps 76 and 76' are driven by means of a rotatable universal drive connection designated at 85 and is best shown in FIGURE 4. The drive connection 85 is journalled on a support 86 secured to the forward end of the rear end 12. Another universal drive connection 87 drives the connection 85 and is in turn connected to be driven by a suitable gearing (not shown) disposed in a gear box 88, the said gearing being driven by the power unit 21.

In the operation, the universal drive connection 87 is driven to operate the pumps 76 and 76'. The entire hydraulic system is disposed on the front frame 11 with only the universal drive connection 87 extending rearwardly of the vertical pivot axis defined by the pivot pins 32 and 33. Thus, no flexible hoses need be carried from the rear frame to the front frame and thus the hydraulic connections are greatly facilitated. Steering of the vehicle is effected by means of the steering wheel 62 which is rotated to actuate the steering valve 78 for alternately supplying fluid under pressure to the conduits 79 and 80 thereby effecting retraction and extension of the pistons 37 which, in turn, cause articulated movement of the front frame 11 with respect to the rear frame 12. The movement of the spool valve 68, in turn, effectuates pressure alternately on the conduits 74 and 75 for actuating the piston rod 51 which will provide for pivotal movement of the bucket 45 to a roll back or to a dump position. Similarly, actuation of the valve spools 69 will cause pressure to be supplied alternately to conduits 72 and 73 thus extending and retracting the piston rods 44 for effectuating raising or lowering of the booms 40 and the bucket 45 contained thereon.

The extension 63 of the front frame 11 permits the compact positioning of the hydraulic system where it is also close to the operator and requires a minimum of flexible hose connections which may be highly undesirable. The problems of maintenance also are greatly facilitated since the hydraulic equipment is all positioned on one frame and is thus readily accessible for service.

Thus, the advantages and the objects of the invention have been fully set forth. It must be understood that changes and modifications may be made without departing from the spirit of the invention as disclosed or from the scope thereof as defined in the appended claims.

What is claimed is:

1. In an articulated front-end tractor loader having front and rear frame sections hingedly connected together for relative movement about a vertical pivot axis, first fluid motor means for moving said front section relative to said rear section, boom arm means pivotally connected to said front section and including a bucket pivotally connected to said boom arm means, second fluid motor means on said front section for raising and lowering said boom arm means and said bucket, third fluid motor means on said front sections for pivoting said bucket, a hydraulic pressure system supported entirely on said front section including a driven pump providing fluid under pressure to said motor means, and driving means on said rear frame section including a power unit and a universal drive member connecting said power unit with said pump, the drive member being positioned substantially over said vertical pivot axis.

2. An articulated front-end tractor loader comprising,
    (a) a tractor frame including front and rear frame sections hingedly connected together about a vertical pivot axis for relative angular movement,
    (b) drive wheels on said frame,
    (c) a first fluid motor connected with said sections for angularly moving the same about said vertical pivot axis,
    (d) a boom pivotally connected to said front section and extending forwardly with respect thereto,
    (e) a bucket pivotally connected to said boom forwardly of said front section,
    (f) a second fluid motor connected to said bucket and said front section for pivoting said bucket,
    (g) a third fluid motor connected to said front section for raising and lowering said boom,
    (h) a power unit on said rear frame,
    (i) a hydraulic system including a pump supported entirely on said front section,
    (j) and universal drive means connecting said power unit with said pump for driving said pump, said drive means being positioned substantially over said vertical pivot axis,
    (k) said hydraulic system including means connecting said pump with said first fluid motor for supplying fluid under pressure thereto.

3. A front-end tractor loader vehicle comprising,
    (a) a front frame,
    (b) a front driving axle structure connected to said front frame,
    (c) a rear frame,
    (d) a rear driving axle structure supporting said rear frame,
    (e) a power unit carried on said rear frame,
    (f) transmission means supported on said rear frame and connected with said power unit to be driven thereby,
    (g) driving means from said transmission means connected with said driving axle structures, (h) means hingedly connecting said front frame to said rear frame for angular movement therebetween about a vertical pivot axis,
(i) first fluid rams interconnecting said frames for relatively moving said frames about said vertical pivot axis to effectuate steering of said vehicle,
(j) a frame extension on said front frame extending horizontally rearwardly of said pivot axis,
(k) an operator station supported on said frame extension,
(l) boom means having an end pivotally connected to said front frame,
(m) an implement pivotally connected to another end of said boom means,
(n) a second fluid ram pivotally connected to said boom means and front frame for raising and lowering said boom means and said implement,
(o) extensible linkage means connected at one end to said front frame and at the other end to said implement for pivoting the same,
(p) said linkage means including a third fluid ram,
(q) a source of fluid under pressure on said front frame including fluid reservoir and pump means connected thereto,
(r) first conduit means on said front frame directing fluid under pressure from said pump means to said second and third fluid rams, second conduit means on said front frame directing fluid from said second and third fluid rams to said fluid reservoir,
(s) a control valve in said conduit means for selectively controlling the fluid flow therethrough, said control valve being located at said operator's station,
(t) a steering valve located at said operator's station,
(u) conduit means on said front frame connecting said steering valve and said pump means to supply fluid under pressure to said first fluid rams and to return fluid therefrom to said reservoir,
(v) a flexible universal drive connection supported on one end on said front frame and connected to said pump means for driving the same, being positioned substantially over said vertical pivot axis,
(w) journal means supporting said drive connection on said rear frame,
(x) and means connecting said universal drive connection to said power unit to be driven thereby.

4. A front-end tractor loader vehicle comprising,
(a) a front frame,
(b) a rear frame,
(c) a power unit carried on said rear frame,
(d) means hingedly connecting said front frame to said rear frame for angular movement therebetween about a vertical pivot axis,
(e) first fluid ram means interconnecting said frames for relatively moving said frames about said vertical pivot axis to effectuate steering of said vehicle,
(f) a frame extension on said front frame extending horizontally rearwardly of said pivot axis,
(g) an operator station supported on said frame extension,
(h) boom means having an end pivotally connected to said front frame,
(i) an implement pivotally connected to another end of said boom means,
(j) second fluid ram means pivotally connected to said boom means and front frame for raising and lowering said boom means and said implement,
(k) extensible linkage means connected at one end to said front frame and at the other end to said implement for pivoting the same,
(l) said linkage means including a third fluid ram means,
(m) a source of fluid under pressure on said front frame including fluid reservoir and pump means connected thereto,
(n) first conduit means on said front frame directing fluid under pressure from said pump means to said second and third fluid ram means, second conduit means on said front frame directing fluid from said second and third fluid ram means to said fluid reservoir,
(o) a control valve in said first and second conduit means for selectively controlling the fluid flow therethrough, said control valve being located at said operator's station,
(p) a steering valve located at said operator's station,
(q) third conduit means on said front frame connecting said steering valve with said pump means for supplying fluid under pressure to said first fluid ram means and to return fluid therefrom to said reservoir,
(r) a flexible universal drive connection supported at one end on said front frame and connected with said pump means for driving the same, said drive connection being positioned substantially over said vertical pivotal axis,
(s) journal means for supporting said drive connection on said rear frame,
(t) and means connecting said universal drive connection with said power unit to be driven thereby.

5. A front-end tractor loader vehicle comprising,
(a) a front frame,
(b) a rear frame,
(c) a power unit carried on said rear frame,
(d) means hingedly connecting said front frame to said rear frame for angular movement therebetween about a vertical pivot axis,
(e) first fluid ram means interconnecting said frames for relatively moving said frames about said vertical pivot axis to effectuate steering of said vehicle,
(f) an operator station supported on said front frame,
(g) boom means having an end pivotally connected to said front frame,
(h) a bucket pivotally connected to another end of said boom means,
(i) second fluid ram means pivotally connected to said boom means and front frame for raising and lowering said boom means and said bucket,
(j) extensible linkage means connected at one end to said front frame and at the other end to said bucket for pivoting the same,
(k) said linkage means including third fluid ram means,
(l) a source of fluid under pressure on said front frame including fluid reservoir and pump means connected thereto,
(m) first conduit means on said front frame directing fluid under pressure from said pump means to said second and third fluid ram means, second conduit means on said front frame directing fluid from said second and third fluid ram means to said fluid reservoir,
(n) a control valve in said first and second conduit means for selectively controlling the fluid flow therethrough, said control valve being located at said operator's station,
(o) a steering valve located at said operator's station,
(p) third conduit means on said front frame connecting said steering valve with said pump means for supplying fluid under pressure to said first fluid ram means and to return fluid therefrom to said reservoir,
(q) a flexible universal drive connection supported on one end on said first frame and connected to said pump means for driving the same, said drive connection being supported substantially over said vertical pivot axis,
(r) and means connecting said universal drive connection with said power unit to be driven thereby.

6. A front-end tractor loader vehicle comprising,
(a) a front frame,
(b) a rear frame,
(c) a power unit carried on said rear frame;
(d) means hingedly connecting said front frame to said rear frame for angular movement therebetween about a vertical pivot axis,
(e) first fluid ram means interconnecting said frames for relatively moving said frames about said vertical pivot axis to effectuate steering of said vehicle,
(f) boom means having an end pivotally connected to said front frame,
(g) a bucket pivotally connected to another end of said boom means,
(h) second fluid dam means pivotally connected to said boom means and front frame for raising and lowering said boom means and said bucket,
(i) extensible linkage means connected at one end to said front frame and at the other end to said bucket for pivoting the same,
(j) said linkage means including third fluid ram means,
(k) a source of fluid under pressure on said front frame including fluid reservoir and pump means connected thereto,
(l) first conduit means on said front frame directing fluid under pressure from said pump means to said second and third fluid ram means, second conduit means on said front frame directing fluid from said second and third fluid ram means to said fluid reservoir,
(m) a control valve in said first and second conduit means for selectively controlling the fluid flow therethrough,
(n) a steering valve on said front frame,
(o) third conduit means on said front frame connecting said steering valve with said pump means for supplying fluid under pressure to said fluid ram means and to return fluid therefrom to said reservoir,
(p) a universal drive connection supported on one end on said first frame and connected with said pump means for driving the same, said drive connection being supported substantially over said vertical pivot axis,
(q) and means connecting said drive connection with said power unit to be driven thereby.

References Cited by the Examiner

UNITED STATES PATENTS

| | | | |
|---|---|---|---|
| 2,418,299 | 4/1947 | Gorsuch | 214—138 |
| 2,827,715 | 3/1958 | Wagner | 37—117.5 |
| 3,007,590 | 11/1961 | Mathew et al. | 214—140 |
| 3,038,619 | 6/1962 | Wagner | 214—140 |
| 3,105,603 | 10/1963 | Beyerstedt et al. | 214—140 |

FOREIGN PATENTS 161,879  3/1955  Australia.

HUGO O. SCHULZ, *Primary Examiner.*